April 18, 1939.    H. K. HARWICK ET AL    2,155,012
SLACK ADJUSTER
Original Filed Sept. 18, 1936    2 Sheets-Sheet 1

INVENTORS.
HENRY K. HARWICK.
HARRISON I. TRAMBLIE.
BY
*John P. Tarbox*
ATTORNEY.

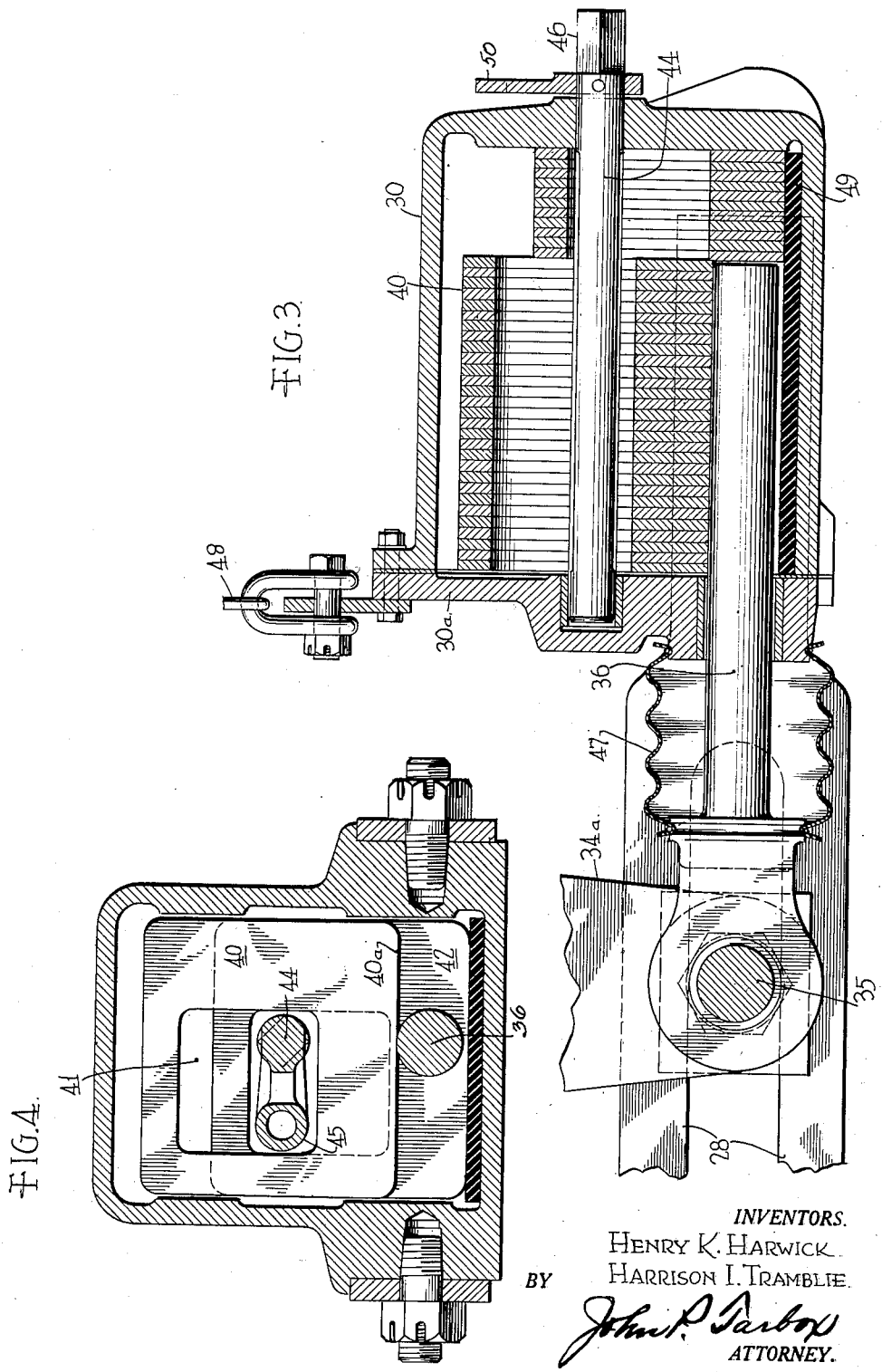

Patented Apr. 18, 1939

2,155,012

UNITED STATES PATENT OFFICE 2,155,012

SLACK ADJUSTER

Henry Kline Harwick, Darby, Pa., and Harrison Ivan Tramblie, Aurora, Ill.; said Harwick assignor to Edward G. Budd Manufacturing Company, Philadelphia, Pa., a corporation of Pennsylvania Application September 18, 1936, Serial No. 101,370
Renewed August 25, 1938

9 Claims. (Cl. 188—201)

This invention relates to slack adjusters and more particularly to an improved slack adjuster for railway brake rigging.

One of the principal objects of the invention is to provide an improved slack adjuster which is of the positive acting shim type in which the shims may be completely sealed in a slack adjuster housing whereby they are entirely unaffected by weather or operating conditions, such slack adjuster having externally operated reset means.

Another object of the invention is to provide an improved slack adjuster which is of light weight and especially suitable for mounting directly on the moving parts of a clasp brake type of railway brake rigging, said slack adjuster having but one projecting adjusting plunger as the sole operating member, such member being readily sealed by a flexible boot thereby reducing friction and assuring effective slack removal in case of brake shoe wear.

A more specific object of the invention is to provide an improved positive action shim type slack adjuster having a plurality of separate adjusting shims adapted to automatically take up for movement of the slack adjuster plunger, such shims having a central cam follower opening by which the shims may be raised to non-operative position by a cam carried by a shaft having an externally projecting portion, all shims being returned to non-operative position without opening the slack adjuster or requiring other than a single operating tool to turn the cam shaft.

Further objects and advantages of the invention will appear from the following description of a preferred form of embodiment thereof, taken in connection with the attached drawings illustrative thereof and in which, Fig. 1 is a side elevation of a portion of a rail car truck.

Fig. 3 is a vertical section through a slack adjuster and certain external parts, and Fig. 4 is a vertical section through the slack adjuster at right angles to Fig. 3.

Figure 1:
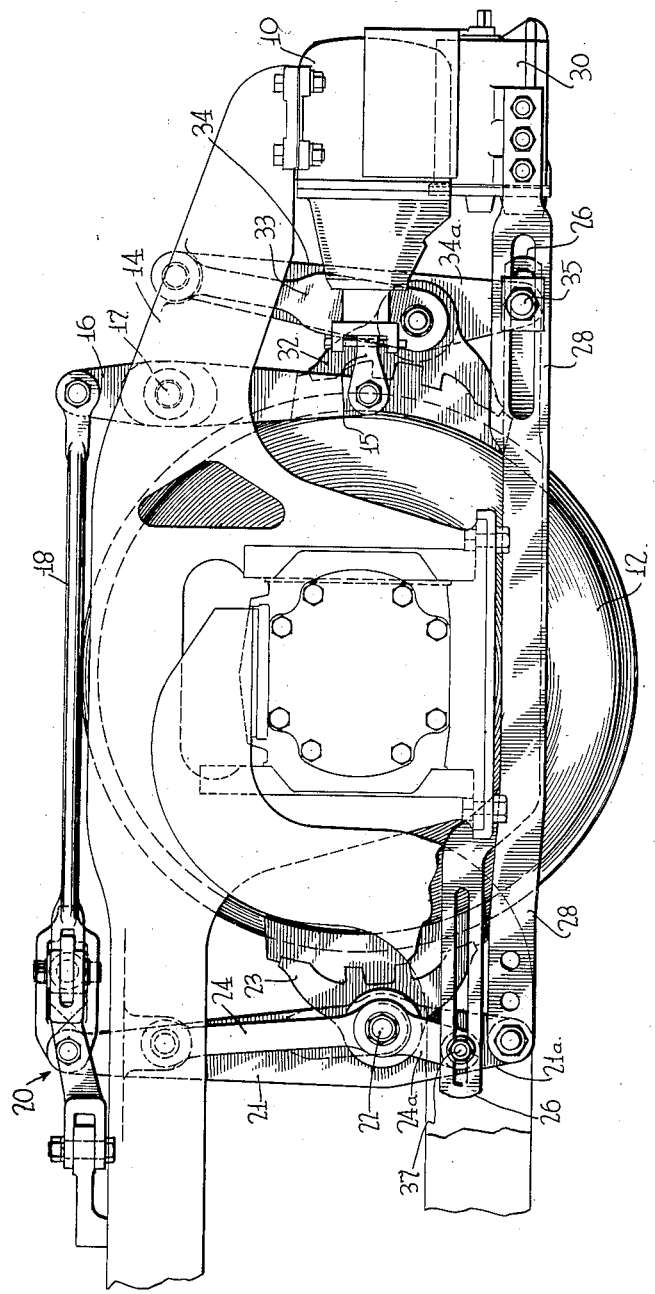

The brake rigging of railway trucks is commonly operated by one or more brake cylinders 10 of which the present construction shows one for each wheel 12. Such cylinder is conveniently mounted on the truck frame 14 and has a piston rod 15 which operates cylinder lever 16 in a well known manner. The cylinder lever 16 is pivoted on the truck frame at 17 and operates pull rod 18 which is connected through universal connections generally represented at 20 with truck lever 21, commonly known as the live lever. Lever 21 is held in suspended position through its pivot 22 on the brake head 23, the brake being carried by brake hangers 24 from the truck frame. Lever 21 has an extension 21a to which is secured connection strap 28 and outer hanger 24 has an extension 24a to which adjuster bar 26 is secured as by pivot 37 having a resilient head.

Figure 2:
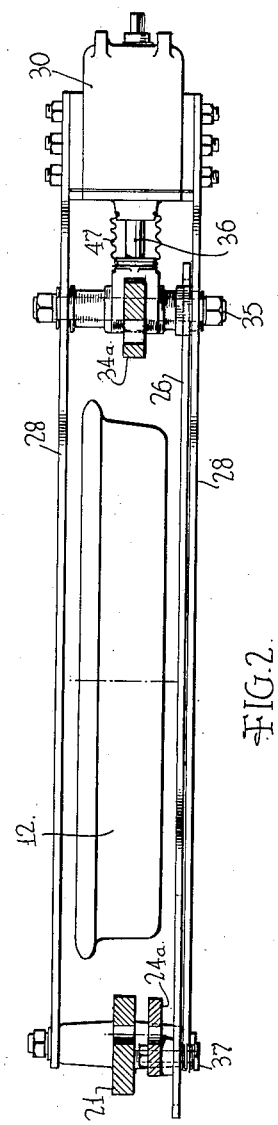
Fig. 2 is a horizontal section through a portion of the truck shown in Fig. 1 with the brake shoes omitted.

The other brake head 32 is supported from the truck frame both by brake hangers 33 and by the hanger or dead lever 34, the lower part 34a of which has a pivot pin 35 which supports the other end of connection strap 28 through its slotted portion. The pivot pin 35 is loosely mounted in the slotted portions of the connection straps 28 so that it may freely slide longitudinally of the slots in the manner of a cross head. Pivot pin 35 also acts as a stop for the adjuster bar 26 and serves as the motion transmitting point for the plunger 36 of the slack adjuster 30 which is bolted to the end of the connection straps 28 as will be seen in Fig. 2.

It will thus be seen that the movement of the brake piston is transmitted to brake head 23 and through connection strap 28 to slack adjuster 30, and thence through slack adjuster plunger 36 to dead hanger lever 34 which directly forces brake shoe 32 into desired contact with the wheel. When the brake piston rod 15 is released, the offset weight of the brake heads 23 and 32 causes them to fall away from the wheel thus causing a relative movement between connection strap 28 and adjuster bar 26 which is frictionally held under pivot 37, then tends to draw slack adjuster plunger 36 out of the slack adjuster 30. If the wear on the shoes is slight, the movement may be insufficient for a shim to drop behind the plunger and on brake actuation, the gain in movement of adjuster bar 26 will be lost. As soon as the wear is greater in proportion to the thickness of a shim, a shim will drop and thus serve as a new abutment for the plunger which thus automatically eliminates the slack.

The novel features of our invention relate more particularly to the form of the slack adjuster and the special provision for resetting when new brake shoes are to be installed. Specifically referring to Figs. 3 and 4, it will be seen that the slack adjuster 30 consists of a housing having a closure 30a, in which are mounted a plurality of shims 40 which are conveniently of a shape that they will not rotate or get out of a freely moving vertical alignment so that they will drop readily into position behind plunger 36. Although a relatively square shape is shown, other shapes would permit this free drop to take up the slack immediately the plunger moves outward.

The plunger 36 extends into the slack adjuster housing and will normally engage the shims either on the lower edges 40a holding them out of operative position or the plunger will engage the lower face 42 when the shims are in the operating position. All of the shims in such position then form a compound abutment extending to the back of the slack adjuster through which the braking force is directed. If the plunger is partially withdrawn, as by operation of adjusting bar 26, another shim will fall into position however and thus increase the projection of plunger 36 which effectively takes up slack in the brake rigging. After the entire number of shims has come into operation or if the brake shoes require readjustment, it is then necessary to replace the slack in the brake rigging to facilitate the insertion of the shoes.

The reset of the shims in this improved slack adjuster is accomplished without opening the housing. Each shim has an opening or cam follower portion 41, all of the shims being traversed by a cam shaft 44, one end of which is internally journaled on closure 30a. A cam 45, having a relatively blunt surface for relatively frictionless contact with the shims, is carried by the cam shaft. The cam shaft 44 further has an external projecting portion 46, which is adapted for receiving a wrench or other turning tool, and when turned to raise all of the shims, the plunger 36 may be reinserted in the slack adjuster housing. If desired, an indicator 50 may be used to show the position of the shims. A resilient pad 49 may be used to prevent vibration and noise of the shims in the operative position.

To further seal the slack adjuster mechanism, a boot 47 may be conveniently applied over plunger 36 and anchored on the housing of the slack adjuster 30. In other respects the cage is absolutely tight and there can be no introduction of dirt, moisture, etc., and the automatic operation of the slack adjuster can always be depended upon. A chain 48 may be attached to the slack adjuster as a safety measure to prevent dropping if any of the supporting mechanism becomes broken.

The location of the slack adjuster is not limited to mounting on the connection strap as it may be placed in other positions of the brake rigging as desired. Its light weight makes this a desirable location however, where it may be readily assembled, inspected and adjusted, and where there is the maximum differential movement in case of slack.

While a preferred form of embodiment of our invention has been shown and described herein, we are aware that modifications may be made thereto and we therefore desire a broad interpretation of our invention within the scope and spirit of the description herein and of the claims appended hereinafter.

We claim as our invention:

1. In combination with a brake rigging of the class described having relatively adjustable members, a slack adjuster between said members including a sealed housing secured to one member and a plunger secured to the other member, shims in said housing, said plunger extending into said housing and normally holding said shims out of operative position, said shims being free to drop into operative position behind the plunger when the plunger moves outwardly, means to move the plunger outwardly on the occurrence of slack in the brake rigging, cam means to return said shims to the non-operative position and a cam shaft extending through said housing and being substantially sealed therewith so that said housing is maintained substantially moisture free.

2. In combination with a brake rigging of the class described having relatively adjustable members, a slack adjuster between said members including a sealed housing secured to one member and a plunger secured to the other member, shims in said housing, said plunger extending into said housing and being sealed thereto and normally holding said shims out of operative position, said shims being free to drop into operative position behind the plunger when the plunger moves outwardly, means to move the plunger outwardly on the occurrence of slack in the brake rigging, said shims having a cam follower portion, a cam extending into said cam follower portion, and a rotatable cam shaft secured to said cam and extending through said housing from a position externally of the housing whereby all of said shims may be moved out of operative position.

3. A slack adjuster for removing the slack in brake rigging which comprises a housing and a plunger secured, respectively, to relatively adjustable parts of the brake rigging, means to draw the plunger out of the housing, shim means in said housing free to drop between the end of the plunger and the housing, and means to raise said shims out of position, including an externally operated internally projecting cam shaft, said housing having an opening through which said cam shaft operates which is substantially the size of the cam shaft, and being otherwise sealed.

4. A slack adjuster for removing the slack in brake rigging which comprises a housing and a plunger secured respectively, to relatively adjustable parts of the brake rigging, means to draw the plunger out of the housing, shim means in said housing free to drop between the end of the plunger and the housing, means to move said shims out of operative position, including an externally operated internally projecting cam shaft, a journal for the end of the cam shaft in an internal part of the slack adjuster housing, said housing having an opening for said cam shaft which is substantially sealed thereby and means to seal the plunger with respect to the housing to prevent the entry of foreign substances into said housing.

5. A slack adjuster for railway brake rigging and adapted to be carried by the connection strap between opposed brake heads of a brake rigging which comprises a housing, a cover for said housing, a plunger secured to a relatively movable member of the brake rigging and being freely movable through said cover, said cover being closed by said plunger, a plurality of shims in said housing having operating portions movable into operative position between the end of the housing and the end of the plunger, means to move the plunger in one direction during the existence of slack in the brake rigging, said shims being freely movable into operative position when the plunger is moved a distance in excess of the thickness of the shims, a rotatable cam means extending through said shims and a cam shaft extending through said housing and connected to said cam means, whereby said shims may be moved from operating position by means external of the housing.

6. A slack adjuster of the class described comprising a housing, a cover for the housing, a plunger relatively movable with respect to the housing and extending through the cover, a plurality of shims in said housing adapted to serve as abutments for the end of the plunger to give relatively secure anchorages for said plunger, an externally projecting cam shaft internally extending through said shims, having means to rotate the shaft for the purpose of raising the shims out of operative position with respect to said plunger, means to indicate the position of the cam, and means to seal the housing at the plunger against the entry of foreign elements.

7. In a brake rigging for railway trucks having a connection strap secured to the live lever and adapted to transmit braking pressures through a dead lever to the respective brake shoes, a slack adjuster having a housing mounted on said connection strap and having a plunger secured to the end of the dead lever, adjusting shims in said housing serving as an abutment between the housing and the end of the plunger, said shims being relatively flat and having openings therein, a cam shaft extending through the shims, and projecting through the housing for external adjustment of the shims, and means to indicate the position of the cam shaft.

8. A slack adjuster for railway brake rigging and adapted to be carried by the connection strap between opposed brake heads of the rigging which comprises a housing, a cover for said housing, a plunger secured to a relatively adjustable member of the brake rigging and being freely movable in said housing, means to move the plunger in one direction during the existence of slack in the brake rigging, a plurality of shims in said housing of relatively polygonal shape to prevent other than vertical movement thereof and being movable into operative position between a part of the housing and the end of the plunger, when the plunger is moved a distance in excess of the thickness of the shims, said shims having a cam follower portion, cam means extending through said shims, said cam means having an outwardly projecting curved surface cooperating with the cam follower portion of the shims to facilitate raising of the shims and a cam shaft extending into the housing and connected to the cam means whereby the shims may be moved from operative position by means external of the housing.

9. A slack adjuster of the class described comprising a housing, a cover for the housing, a plunger and cam shaft each relatively movable with respect to the housing and extending into the housing and sealing the same against moisture, a plurality of shims in said housing adapted to serve as abutments for the end of the plunger to give relatively secure anchorages for said plunger and a cam on said cam shaft sealed within said housing, and operative to raise said shims upon rotation of the cam shaft, said shaft being rotatable for the purpose of raising the shims out of operative position with respect to said plunger.

HENRY K. HARWICK.
HARRISON I. TRAMBLIE.